United States Patent
Ke et al.

(10) Patent No.: US 8,998,436 B2
(45) Date of Patent: Apr. 7, 2015

(54) LIGHT SOURCE APPARATUS OF BACKLIGHT MODULE

(75) Inventors: Chih-Hsun Ke, Hsinchu (TW);
Ming-Ta Tsai, Hsinchu (TW); Pu-Xian Hsu, Hsinchu (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 278 days.

(21) Appl. No.: 13/535,368

(22) Filed: Jun. 28, 2012

(65) Prior Publication Data

US 2013/0135900 A1    May 30, 2013

(30) Foreign Application Priority Data

Nov. 30, 2011  (CN) .......................... 2011 1 0388869

(51) Int. Cl.
| | |
|---|---|
| G09F 13/04 | (2006.01) |
| G09F 13/08 | (2006.01) |
| F21V 7/04 | (2006.01) |
| G02B 6/04 | (2006.01) |
| H01L 33/00 | (2010.01) |
| F21V 9/00 | (2006.01) |
| F21V 8/00 | (2006.01) |

(52) U.S. Cl.
CPC ............ *G02B 6/0068* (2013.01); *G02B 6/0076* (2013.01); *G02B 6/0078* (2013.01)

(58) Field of Classification Search
CPC .... G02B 6/0068; G02B 6/001; G02B 6/0011; G02B 6/0076; G02B 6/12004; G02F 1/133606; G02F 1/133602; G02F 1/133615; G02F 1/133603; G02F 6/0038
USPC ......... 362/607, 555, 612, 610, 616, 615, 231, 362/23.09, 97.1–97.3, 554
See application file for complete search history.

(56) References Cited

U.S. PATENT DOCUMENTS

| | | | |
|---|---|---|---|
| 6,608,614 B1 * | 8/2003 | Johnson ........................ | 345/102 |
| 7,512,300 B2 * | 3/2009 | Robertson et al. ............ | 385/101 |
| 2009/0027587 A1 * | 1/2009 | Itoh et al. ........................ | 349/61 |
| 2009/0027588 A1 * | 1/2009 | Medendorp et al. ............ | 349/62 |
| 2011/0013419 A1 * | 1/2011 | Horng et al. .................. | 362/612 |

* cited by examiner

*Primary Examiner* — Peggy Neils
*Assistant Examiner* — William N Harris
(74) *Attorney, Agent, or Firm* — Novak Druce Connolly Bove + Quigg LLP

(57) ABSTRACT

A light source apparatus includes a light guide plate, a number of optical fibers, at least two first light emitting diodes, and at least two second LEDs. Each fiber has a light exiting surface facing the light guide and at least two light entrances at both ends of the fiber. The second LEDs are located on both sides of the light guide plate. Light generated by the first LEDs has a wavelength longer than that generated by the second LEDs. The light generated from the first LEDs enters the light guide plate after travelling through the optical fiber to mix with the light generated from the second LEDs to provide a good color rendering property of the light generated by the light source.

14 Claims, 3 Drawing Sheets

LIGHT SOURCE APPARATUS OF BACKLIGHT MODULE

BACKGROUND

1. Technical Field

The disclosure is related to a light source apparatus of a backlight module, and particularly to a light source apparatus having good chromatography and high color rendering property.

2. Description of Related Art

Light emitting diodes (LEDs) are technologically and economically advantageous solid state light sources. LEDs are capable of reliably providing light with high brightness, hence in the past decades they have come to play a critical role in numerous applications, including flat-panel displays, traffic lights, and optical communications. Most of the LEDs used in current backlight modules are white light LEDs composed of blue light chips with yellow phosphor. However, the color rendering property of the white light LED may be degraded, and its color production property may be considerably degraded due to a low light intensity in a long wavelength. Further, there are conventional white light LEDs that emit white light using the combination of blue chips with red and green phosphors having different excitation wavelengths. Since the white light LEDs have red, green, and blue peak wavelengths, the white light LEDs have color rendering and color reproduction properties superior to the white light LEDs using a yellow phosphor. However, the light extraction efficiency of the white light LEDs having blue chips with red and green phosphors is degraded. There is an ongoing need for ways to construct backlight modules with greater energy efficiency, with improved color rendering property, with improved light extraction efficacy, and with longer duration of service.

BRIEF DESCRIPTION OF THE DRAWINGS

The components in the drawings are not necessarily drawn to scale, the emphasis instead being placed upon clearly illustrating the principles of a light source apparatus of a backlight module. Moreover, in the drawings, like reference numerals designate corresponding parts throughout the several views.

DETAILED DESCRIPTION

The disclosure will be described with references to the accompanying diagrams.

Figure 1:
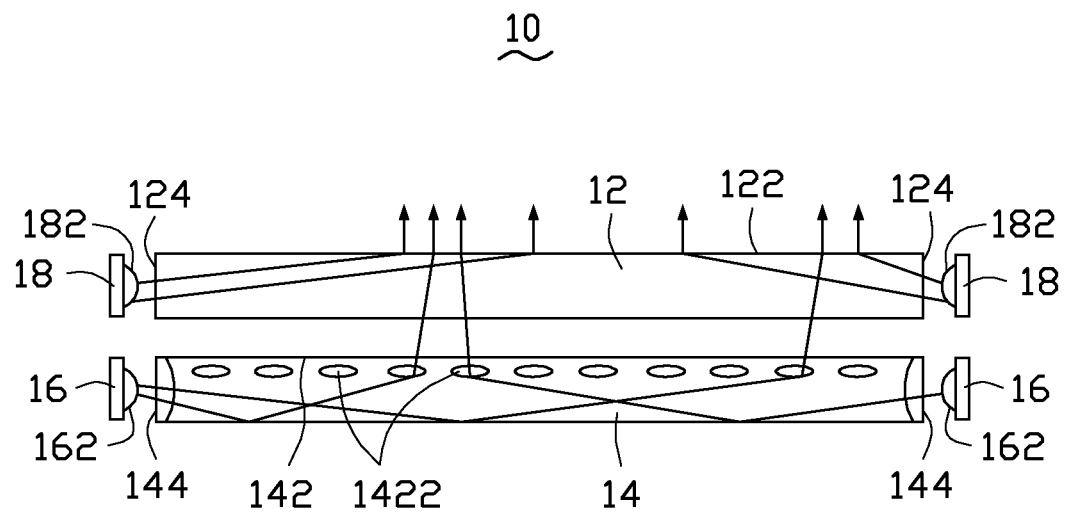
FIG. 1 is a cross-sectional diagram illustrating a light apparatus of a backlight module according to a first embodiment of the disclosure.

FIG. 1 shows a light apparatus 10 of a backlight module. The light apparatus 10 has a light guide 12, a plurality of optical fibers 14, at least two first light emitting diodes 16, and at least two second LEDs 18. The light guide plate 12 has a top surface acting as a light emitting surface 122, and two side surfaces, positioned opposite to each other, acting as light incident surfaces 124. The optical fibers 14 are overlapped by the light guide plate 12. Each optical fiber 14 has a light exiting surface 142 facing the light guide plate 12 and two light entrances 144 positioned on both ends of each optical fiber 14. Each optical fiber 14 further has a plurality of microstructures 1422 positioned on the light exiting surface 142. The microstructures 1422 are substantially positioned on a plane perpendicular to the light entrances 144.

The first LEDs 16 are positioned on both ends of the optical fibers 14 and face the light entrances 144 of the optical fibers. Light generated by the first LEDs 16 enters the optical fibers 14 from the light entrances 144, transmits through the optical fibers 14, and leaves the optical fibers 14 from the microstructure 1422 on the light exiting surface 142 to the light guide plate 12.

Figure 2:
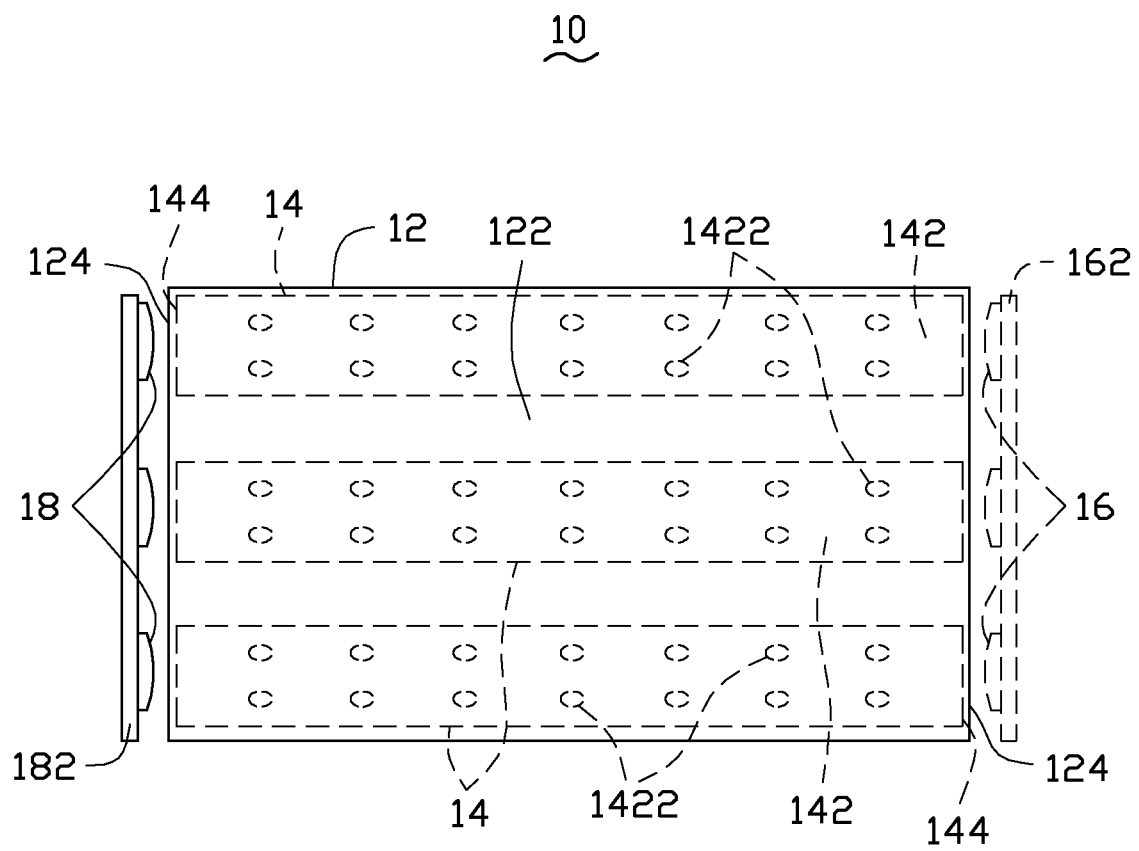
FIG. 2 is a top-view diagram illustrating the light apparatus of the backlight module of the first embodiment.

The second LEDs 18 are placed on opposite side of the light guide plate 12 and face the light incident surfaces 124 of the light guide plate 12. Light generated by the second LEDs 18 enters the light guide plate 12 from the light incident surfaces 124, travels through the light guide plate 12, and leaves the light guide plate 12 from the light emitting surface 122. In the first embodiment, the first LEDs 16 are arranged as first light bars 162, and the second LEDs 18 are arranged as second light bars 182 (see FIG. 2). The first LEDs 16 and the second LEDs 18 have different wavelengths. The electronic requirements for LEDs of different wavelengths are distinct. Therefore, the first LEDs 16 on the first light bars 162 and the second LEDs 18 on the second light bars 182 are provided with independent circuits to simplify the circuit design and configuration of the light apparatus 10. The first LEDs 16 emit white light and the second LEDs 18 emit red light. Controlling the circuits for the second LEDs 18 to control the intensity of the red light generated by the second LEDs 18 determines the color temperature of the light apparatus 10. The independent package of the first LEDs 16 on the first light bars 162 and the second LEDs 18 and the second light bars 182 enables the heat generated by the first LEDs 16 to be separated from the heat generated by the second LEDs 18; thus the heat generated by the light apparatus 10 does not accumulate together and can be more easily dissipated. Since the optical fibers 14 have good total reflection property and the microstructures 1422 are capable of enhancing light dispersing efficiency, white light from the first LEDs 16 transmitted through the optical fibers 16 is luminous and dispersed uniformly. By overlapping the light guide plate 12 and the optical fibers 14, red light from the second LEDs 18 is mixed with the white light from the first LEDs 16 to increase color rendering property of the light apparatus 10. Since the first LEDs 16 are positioned at the ends of the optical fibers 14 and the second LEDs 18 are positioned to face the side surface of the light guide plate 26, the light apparatus 10 is used as a side lighting backlight module. As the optical fibers 14 each has a total internal reflection exceeding 99%, the use of the optical fibers 14 can reduce the required number of the first LEDs 16.

Figure 3:
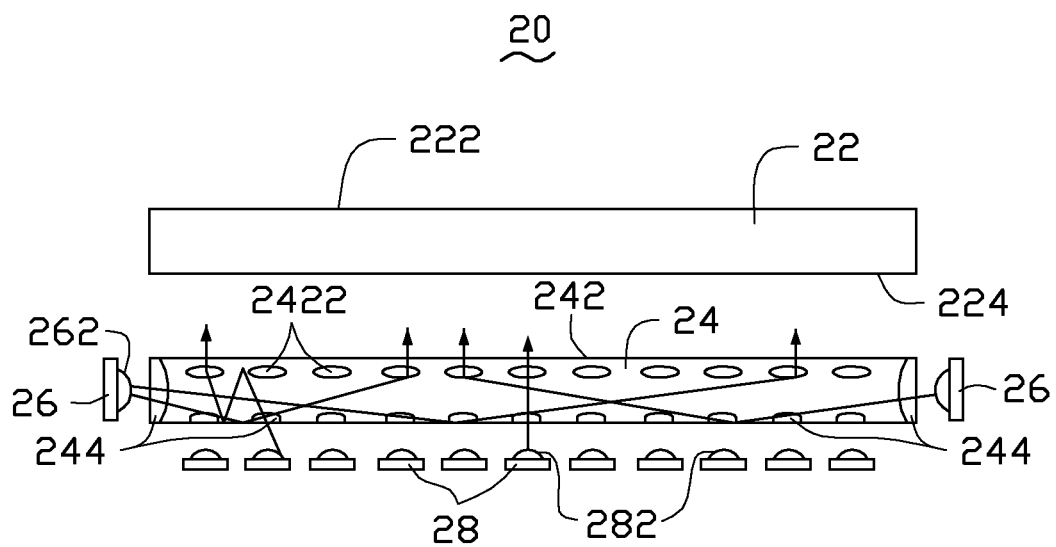
FIG. 3 is a cross-sectional diagram illustrating a light apparatus of a backlight module according to a second embodiment of the disclosure.

FIG. 3 shows a light apparatus 20 of a backlight module according to a second embodiment of the disclosure. The light apparatus 20 has a light guide plate 22, a plurality of optical fibers 24, at least two first LEDs 26, and a plurality of second LEDs 28. The light apparatus 20 has a similar configuration to the light apparatus 10 of the first embodiment. The optical fibers 24 are positioned under the light guide plate 22. Comparing the light apparatus 10 of the first embodiment, the light guide plate 22 has a light emitting surface 222 on a top surface and a light incident surface 224 on a bottom surface. The light emitting surface 222 is parallel to the light incident surface 224.

Each optical fiber 24 has a light exiting surface 242 positioned on a top surface of the optical fiber 24 and a plurality of light entrances 244. The light entrances 244 are positioned on both ends opposite to each other and a bottom surface of each optical fiber 24. Each optical fiber 24 further has a plurality of microstructures 2422 formed on the light exiting surface 242.

Comparing the first embodiment, the optical fibers 24 of the second embodiment has light entrances 244 positioned not only on both ends of the optical fiber 24 to face the first LEDs 26, but also on the bottom of the optical fiber 24 to face the second LEDs 28. The first LEDs 26 are arranged as first light bars 262, and the second LEDs 28 are arranged as second light bars 282.

The first LEDs 26 emit white light and the second LEDs 28 emit red light. The first LEDs 26 and the second LEDs 28 have different wavelengths. White light generated by the first LEDs 26 enters the optical fibers 24 from the light entrances 244 on the side surfaces. Red light generated by the second LEDs 28 enters the optical fibers 24 from the light entrances 244 on bottom of the optical fiber 24. White light and the red light is mixed and transmitted through the optical fibers 24 that leave from microstructures 2422 on the light exiting surface 242 to the light guide plate 22. The white light and the red light enter the light guide plate 22 from the light incident surface 224, mix in the light guide plate 22 again to be more uniform and leave from the light emitting surface 222 of the light guide plate 22. White light from the first LEDs 26 is mixed with the red light from the second LEDs 28 to increase color rendering property of the light apparatus 20. Since the second LEDs 28 are positioned under the light guide plate 22 and the optical fibers 24, the light apparatus 20 is used as a direct lighting backlight module.

The light apparatus of the disclosure has a plurality of optical fibers placed under the light guide plate. Light from the first LEDs and the second LEDs is mixed and guided through the optical fibers and the light guide plate to enhance color render property of the light apparatus. The first LEDs and the second LEDs are arranged with independent circuit to control color temperature of the light apparatus.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A light source apparatus of a backlight module, comprising:
   a light guide plate;
   a plurality of optical fibers positioned under the light guide plate, each fiber of the plurality of optical fibers comprising:
      a light exiting surface facing the light guide plate; and
      two light entrances, each of the two light entrances located at an end of each optical fiber;
   at least two first light emitting diodes (LEDs) positioned at both ends of each optical fiber; and
   at least two second LEDs positioned at opposite sides of the light guide plate,
   wherein the at least two first LEDs and the at least two second LEDs have different wavelengths,
   wherein a plurality of microstructures are located on the light exiting surface, and light generated by the at least two first LEDs configured to enter each optical fiber from the light entrances, the light configured to leave each optical fiber only from the plurality of microstructures on the light exiting surface, the light being transmitted to the light guide plate.

2. The light source apparatus of claim 1, wherein the light guide plate comprises:
   a light emitting surface positioned on a top surface of the light guide plate;
   and at least two light incident surfaces positioned on opposite side surfaces of the light guide plate;
   wherein the light emitting surface is perpendicular to the light incident surfaces.

3. The light source apparatus of claim 2, wherein light generated by the at least two second LEDs enters the light guide plate from the at least two light incident surfaces and leaves the light guide plate from the light emitting surface.

4. The light source apparatus of claim 1, wherein the at least two first LEDs are arranged as first light bars facing the light entrances of each optical fiber.

5. The light source apparatus of claim 2, wherein the at least two second LEDs are arranged as second light bars facing the at least two light incident surfaces of the light guide plate.

6. The light source apparatus of claim 1, wherein the at least two first LEDs emit white light and the at least two second LEDs emit red light.

7. The light source apparatus of claim 1, wherein the light source apparatus is a side lighting backlight module.

8. A light source apparatus of a backlight module, comprising:
   a light guide plate;
   a plurality of optical fibers positioned under the light guide plate, each optical fiber comprising:
      a light exiting surface facing the light guide plate; and
      a plurality of light entrances located on a bottom surface and both ends of each optical fiber;
   at least two first light emitting diodes positioned at both ends of each optical fiber; and
   at least two second LEDs positioned under the optical fibers;
   wherein the first LEDs and the second LEDs have different wavelengths;
   wherein a plurality of microstructures are located on the light exiting surface, and light generated by the at least two first LEDs enters each optical fiber from the light entrances on both ends of each optical fiber, and can only leave each optical fiber from the microstructures on the light exiting surface, the light being transmitted to the light guide plate.

9. The light source apparatus of claim 8, wherein the light guide plate comprises:
   a light emitting surface positioned as a top surface of the light guide plate; and
   a light incident surface positioned as a bottom surface of the light guide plate;
   wherein the light emitting surface is parallel to the light incident surface.

10. The light source apparatus of claim 8, wherein the light exiting surface of each optical fiber is on a top surface of the fiber, and a plurality of microstructures are located on the light exiting surface.

11. The light source apparatus of claim 8, wherein light generated by the at least two second LEDs enters each optical fiber from the light entrances on the bottom surface of each optical fiber, leaves each optical fiber from the microstructures on the light exiting surface, and transmits to the light guide plate.

12. The light source apparatus of claim 8, wherein the at least two first LEDs are packaged as first light bars facing the light entrances of the fibers.

13. The light source apparatus of claim 8, wherein the at least two second LEDs are packaged as second light bars facing the light incident surface of the light guide plate.

14. The light source apparatus of claim 8, wherein the at least two first LEDs emit white light and the at least two second LEDs emit red light.

\* \* \* \* \*